United States Patent Office 3,272,640
Patented Sept. 13, 1966

3,272,640
WATER INSOLUBILIZING AND INSENSI-
TIZING PROCESS
Robert M. Geurden, Wilmington, Del., assignor to
Hercules Powder Company, Wilmington, Del., a
corporation of Delaware
No Drawing. Filed Dec. 22, 1960, Ser. No. 77,496
The portion of the term of the patent subsequent to
Feb. 12, 1980, has been disclaimed
30 Claims. (Cl. 106—131)

The present invention relates to reducing the water solubility and the water sensitivity of water-soluble materials. More specifically, the present invention relates to a process of accomplishing these desired results by reacting water-soluble materials, e.g. water-soluble polymers, with insolubilizing agents in the presence of a hydrophobic film former. The term "hydroxyalkyl polysaccharide ethers" is used herein to designate one type of water-soluble materials applicable herein and by this term is meant ethers of polysaccharides containing hydroxyalkyl groups, including, e.g., polysaccharide ethers containing other substituent groups besides the hydroxyalkyl group, hydroxyalkyl carboxyalkyl polysaccharide ethers being a specific example of the latter.

My copending application Serial No. 77,495 filed on even date herewith and entitled, "Insolubilization Process," now U.S. Patent No. 3,077,468 which issued on February 12, 1963, describes and claims a process of insolubilizing the hydroxyalkyl polysaccharide ethers of the present invention, using certain of the insolubilizing agents of the present invention. While the process of said copending application gives quite satisfactory insolubilization, for some applications a substantially lower degree of water sensitivity is desired. Although the water solubility of the ethers has been reduced to a quite satisfactory level in accordance with the process of said copending application, their sensitivity to water has not been reduced enough to prevent their swelling in the presence of moisture to an undesirable extent for some applications. This swelling causes a reduction in the physical strength properties of articles made from these ethers.

The water sensitivity of water-soluble materials containing hydrophilic groups can be reduced by chemically converting the hydrophilic groups to hydrophobic groups. The drawback of this method, however, is that it requires a very high degree of conversion which in many cases cannot be obtained to the desired extent, and in those cases where it can be obtained the cost is prohibitive. An ideal system would be one wherein the water-insoluble material is applied (e.g., when using as a coating or when casting films) from an aqueous system and rendered water insensitive and water insoluble in the same operation.

I have found according to this invention that in addition to insolubilizing water-soluble materials, their water sensitivity is also either drastically reduced or eliminated by carrying out the process which comprises reacting same with an insolubilizing agent in the presence of a hydrophobic film former.

This invention is applicable to reducing the water solubility and the water sensitivity of water-soluble materials in general. One type of such materials, is water-soluble polymers which contain either carboxyl, hydroxyl, amine or amide groups or any combination of said groups, the major part of each of said polymers containing at least 10 monomer units, and this is the sense in which the terms "water-soluble polymers" and "water-soluble materials" are used in the claims and elsewhere herein. Typical examples of such water-soluble polymers include the following and the like: cellulose derivatives, e.g. carboxyalkyl celluloses such as carboxymethylcellulose, hydroxyalkyl celluloses such as hydroxyethyl cellulose, carboxyalkyl hydroxyalkyl celluloses such as carboxymethyl hydroxyethyl cellulose, sulfoalkyl celluloses such as sulfoethyl cellulose, alkyl celluloses such as methyl cellulose, alkyl hydroxyalkyl celluloses such as ethyl hydroxyethyl cellulose, alkylene celluloses such as allyl cellulose, alkylene alkyl celluloses such as allyl ethyl cellulose, dialkylaminoalkyl celluloses such as diethylaminoethyl cellulose, dialkylaminoalkyl hydroxyalkyl celluloses such as diethylaminoethyl hydroxyethyl cellulose, and various other substituted celluloses, either in the free acid form or water-soluble salts thereof such as alkali metal and ammonium salts; starches, e.g. potato starch, wheat starch and corn starch; starch derivatives, e.g. carboxyalkyl starches such as carboxymethyl starch, hydroxyalkyl starches such as hydroxyethyl starch, dialkylaminoalkyl starches such as diethylaminoethyl starch, dialkylaminoalkyl hydroxyalkyl starches such as diethylaminoethyl hydroxyethyl starch, various other starch derivatives such as those corresponding to the above cellulose derivatives, and oxidized starches; vegetable gums, e.g. algin, guar gum, locust bean gum, gum tragacanth, gum arabic agar, psyllium seed, Irish moss, and water-soluble salts thereof such as alkali metal and ammonium salts; proteins such as casein, gelatin, animal glue, and soybean protein; synthetic polymers, e.g. poly(vinyl alcohol), poly(acrylic acid) and substituted poly(acrylic acid) such as poly(methacrylic acid), water-soluble copolymers derived from maleic anhydride such as maleic anhydride-styrene copolymers, and water-soluble salts thereof such as alkali metal and ammonium salts; polyamides such as polyacrylamide; polymeric amines such as polyvinylamine and polyethylenimine; and so on. The above water-soluble materials are given only as examples and not in any way as limitations on the present invention.

The following examples illustrate specific embodiments of the present invention, but they are not intended to limit the invention other than as defined in the claims of this application. In the examples and elsewhere herein percent is by weight. The procedure employed in carrying out the examples below was as follows.

First, the insolubilizing agent and then the hydrophobic film former was added while stirring to a 5% aqueous solution of the material to be insolubilized. Films were cast on glass plates from the resulting mixture. These films were approximately 75 mils thick when wet and 2 mils thick when dry. The films were then dried. The water properties of the films were measured in the following three ways: (1) *Determination of water uptake:* The water uptake of the films was determined by depositing for one minute 10 drops of water on top of the dried film, removing with an ink blotter any water not taken up by the film and then weighing the amount of water taken up by the film. (2) *Determination of percent insoluble:* A one centimeter square portion of dried film was weighed immediately after drying and promptly soaked by immersing in 500 ml. of distilled water at room temperature (approximately 25° C.) for one hour and then dried to constant weight and finally weighed. The percent insoluble values were calculated by the formula: weight of dry film after soaking divided by weight of dry film before soaking. (3) *Determination of percent swell:* A one centimeter square portion of dried film was weighed immediately after drying and then promptly soaked by immersing in 500 ml. of distilled water at room temperature for one hour and then blotted off with an ink blotter and finally weighed. The percent swell values were calculated by the formula: weight of blotted film minus weight of dried film divided by weight of dried film. The films were dried at the temperatures indicated in Table 1 below. In (1) above the water properties of the films were measured while the films were still on the glass plates. In (2) and (3) above the water properties of the films were measured after removing them from the glass plates. Further details are given in Table 1 which follows. All viscosities were measured at 25° C.

TABLE 1

| Example No. | Material Insolubilized | Insolubilizing Agent | | Hydrophobic Agent | | Temp., °C. | Water Properties of Film | | |
|---|---|---|---|---|---|---|---|---|---|
| | | Type | Amount[1] | Type | Amount[1] | | Percent Insoluble | Percent Swell | Percent H$_2$O Uptake |
| 1 | HEC[2] | MA[3] | 4 | None | | 100 | 91.13 | 92.8 | 22.5 |
| 2 | HEC[2] | None | | LO[4] | 25 | 100 | Soluble | Soluble | 10.4 |
| 3 | HEC[2] | MA | 4 | LO[4] | 25 | 100 | 91.0 | 58.7 | 0.89 |
| 4 | HEC[2] | None | | LO[4] | 3.75 | 100 | Soluble | Soluble | 10.4 |
| 5 | HEC[2] | MA | 4 | LO[4] | 3.75 | 100 | 91.0 | 60.0 | 2.2 |
| 6 | HEC[2] | Glyoxal | 10 | None | | 100 | 94.6 | 93.2 | 35.0 |
| 7 | HEC[2] | do | 10 | LO | 25 | 100 | 95.0 | 51.0 | 0.9 |
| 8 | HEC[2] | CD[5] | 10 | None | | 100 | 96.4 | 37.38 | 1.4 |
| 9 | HEC[2] | CD[5] | 10 | LO | 10 | 100 | 97.78 | 25.91 | 0.3 |
| 10 | HEC[2] | None | | P. Wax[6] | 3.50 | 100 | Soluble | Soluble | 15.6 |
| 11 | HEC[2] | MA | 5 | do | 3.50 | 100 | 92.5 | 57.2 | 9.9 |
| 12 | HEC[2] | MaA[7] | 10 | None | | 130 | 94.7 | 49.0 | 25.0 |
| 13 | HEC[2] | None | | DCO[8] | 3.75 | 130 | Soluble | Soluble | 5.9 |
| 14 | HEC[2] | MaA | 10 | DCO[8] | 3.75 | 130 | 94.0 | 35.0 | 3.0 |
| 15 | HEC[2] | None | | Tung Oil | 3.75 | 130 | Soluble | Soluble | (*) |
| 16 | HEC[2] | MA | 4 | do | 3.75 | 100 | 91.8 | 55.4 | 3.2 |
| 17 | HEC[2] | MA | 12 | None | | 100 | 82.11 | 99.84 | 28.0 |
| 18 | HEC[2] | MA | 12 | Beeswax[9] | 3.75 | 100 | 85.73 | 63.42 | 2.5 |
| 19 | Cellulose Sulfate[10] | Kymene[11] | 20 | None | | 70 | 89.2 | 85.6 | |
| 20 | do | do | 20 | LO | 3.75 | 70 | 91.0 | 45.7 | |
| 21 | Wheat Starch | do | 10 | None | | 70 | 91.0 | 94.5 | |
| 22 | do | do | 10 | DCO[8] | 3.75 | 70 | 91.4 | 49.0 | |
| 23 | CMS[12] | do | 20 | None | | 70 | 89.5 | 92.3 | |
| 24 | CMS[12] | do | 20 | P. Wax[6] | 3.75 | 70 | 90.9 | 45.8 | |
| 25 | Algin | do | 20 | None | | 70 | 91.3 | 89.7 | |
| 26 | do | do | 20 | LO[4] | 3.75 | 70 | 92.5 | 48.5 | |
| 27 | Locust Bean Gum | do | 20 | None | | 70 | 89.0 | 97.0 | |
| 28 | do | do | 20 | LO | 3.75 | 70 | 89.7 | 46.3 | |
| 29 | Gelatin[13] | do | 20 | None | | [14]65 | 91.4 | 95.0 | |
| 30 | do | do | 20 | LO | 3.75 | [14]65 | 90.0 | 47.6 | |
| 31 | Poly(vinyl alcohol) | do | 20 | None | | [14]65 | 70.3 | 99.2 | |
| 32 | do | do | 20 | LO | 3.75 | [14]65 | 72.8 | 48.5 | |
| 33 | Poly(acrylic acid) | do | 20 | None | | 105 | 82.0 | 89.4 | |
| 34 | do | do | 20 | LO | 3.75 | 105 | 81.9 | 46.2 | |
| 35 | Polyacrylamide | do | 20 | None | | 105 | 86.0 | 87.0 | |
| 36 | do | do | 20 | LO | 3.75 | 105 | 87.1 | 44.9 | |
| 37 | CMC[15] | do | 5 | None | | 105 | 85.6 | 95.0 | |
| 38 | CMC[15] | do | 5 | LO | 3.75 | 105 | 87.1 | 48.3 | |

[1] Percent by weight of material insolubilized.
[2] Hydroxyethyl cellulose. D.S. 2.50. Medium viscosity.
[3] Maleic anhydride.
[4] Linseed oil.
[5] Copper dichromate.
[6] Paraffin wax. Fully refined. ASTM melting point 135° F.-137° F. Oil content less than 0.5% by weight.
[7] Methacrylic acid.
[8] Dehydrogenated castor oil.
[9] Sun-bleached. Melting point 144° F.-146° F. Saponification number 90-98.
[10] D.S. 0.31. Viscosity 1,000 cps. at 2%.
[11] A polyamide-epichlorohydrin resin—U.S. Patent No. 2,926,154.
[12] Carboxymethyl wheat starch. D.S. 0.67. Viscosity 1,180 cps. at 2%.
[13] 205 Bloom gelatin.
[14] Under a vacuum of 30 inches of mercury.
[15] Carboxymethylcellulose. D.S. 0.89. Viscosity 800 cps. at 2%.
* Film disintegrated.

*Example 39.—Treating HES*

Hydroxyethyl starch (HES) was reacted at 130° C. with 4% by weight thereof maleic anhydride. This gave a product having 92.4% insoluble, but the water sensitivity of the product was undesirably high. The experiment was repeated in the presence of 5% linseed oil by weight of the HES to give a product having about the same percent insoluble but a substantially lower and satisfactory water sensitivity. The HES used has a D.S. of 0.62 and a viscosity of 640 cps. at 5%.

*Example 40.—Treating CMHEC*

Example 39 was repeated using carboxymethyl hydroxyethyl cellulose (CMHEC) instead of HES and substantially the same results were obtained. That is, without the linseed oil the percent insoluble of the reaction product was satisfactory but its water sensitivity was undesirably high; whereas, carrying the reaction out in the presence of the 5% linseed oil did not change the percent insoluble substantially but considerably reduced the water sensitivity to a satisfactory level. The CMHEC used had a 0.3 carboxyalkyl D.S., a 0.7 hydroxyalkyl D.S. and a medium viscosity.

In addition to the above examples, the following experiments were successfully carried out in accordance with this invention. In one experiment a water-soluble ammonia salt of a mallenized linseed oil was used as the hydrophobic film former to reduce the water sensitivity of a hydroxyethyl cellulose film which had been insolubilized with methacrylic acid. The mallenized oil was prepared by reacting maleic anhydride with linseed oil, and the salt was prepared by reacting the malenized linseed oil with ammonia. Other drying oils besides linseed and other dibasic unsaturated aliphatic acids or anhydrides besides maleic may be used. Likewise, amines may be substituted for ammonia. This is an example of starting out with a water-soluble hydrophobic film former which becomes water insoluble during the process of preparing the film. These amine salts of oil-modified acids are sold under the name "Aralon." Another experiment was carried out using as the insolubilizing agent a water-soluble polyepoxide in combination with linseed oil as the hydrophobic film former. The polyepoxide used is sold as "Emlon E-200." This experiment was repeated using instead of the polyepoxide a water-soluble phenolformaldehyde resin sold as "Plyophen Resin 5671." This experiment was again repeated using instead of the polyepoxide a water-soluble cationic melamine-formaldehyde resin sold as "Resin T-106." These water-soluble cationic melamine-formaldehyde resins are disclosed and claimed in U.S.P. 2,577,767. Instead of the water-soluble cationic melamine-formaldephyde resins, I may also use as the insolubilizing agent water-soluble cationic urea-aldehyde resins, e.g., those as disclosed and claimed in U.S.P. 2,626,251. All of these experiments gave very satisfactory hydroxyethyl cellulose films of a high percent water-insolubility and a low percent swell in water.

From the above examples it will be seen that treating the water-soluble materials with both an insolubilizing agent and a hydrophobic film former imparts far greater water resistance to the water-soluble materials than treating them separately with either an insolubilizing agent or a hydrophobic film former. Furthermore, the increased water resistance obtained by treating the water-soluble materials with insolubilizing agents in the presence of hydrophobic film formers is even substantially greater than could be predicted from the additive effect of treating the water-soluble materials with the insolubilizing agent and hydrophobic film former separately. In the preceding paragraph experiments, the amounts of hydrophobic and insolubilizing agents used were 3.75% and 10%, respectively of the HEC.

Although the foregoing illustrates specific embodiments of my invention, the artisan will appreciate that one may operate outside these conditions and still be within the scope of the claims hereof.

Applicable hydrophobic film formers include materials which either already are, or which under the conditions of application of the products of this invention become, water insoluble, water impervious and water insensitive to a substantial degree. The hydrophobic film formers also must be capable of being uniformly and stably distributed throughout an aqueous medium which already contains the insolubilizing agent or to which the insolubilizing agent may be subsequently added, this uniformity and stability of distribution being maintained until the materials to be insolubilized are used. The hydrophobic film former must also migrate to the surface of the materials to be insolubilized soon after using said materials and before insolubilizing. In addition, of course, as designated by the name, this material which migrates to the surface of the material to be insolubilized must be hydrophobic and must be capable of forming a film.

Hydrophobic film formers having the above qualifications and therefore applicable in the present invention include (1) *drying oils*, e.g. linseed oil, dehydrogenated castor oil, tung oil, soybean oil, poppyseed oil, hempseed oil, oiticica, fish oil, safflower oil, perilla, tall oil and sunflower oil; (2) *waxes*, e.g. animal and insect waxes including beeswax, hydrogenated spermaceti wax, Chinese wax, shellac wax, vegetable waxes including carnauba wax, ouricury wax, palm wax, candelilla wax, sugar cane wax, mineral waxes including montan wax, ozocerite wax, synthetic waxes, and petroleum waxes including paraffin waxes; (3) *resins*, e.g. those as will now be more fully defined:

Alkyd resins, i.e., the complexes resulting from the reaction of polybasic alcohols and resinifying carboxylic organic acids such as, e.g., polybasic acids and their anhydrides.

Phthalic acid or phthalic anhydride alkyd resins, i.e., alkyd resins made with phthalic acid or phthalic anhydride as the major acid reactant. The art often calls these simply "phthalic alkyds."

Maleic alkyd resins, i.e., resins based on maleic anhydride or acids derived from maleic anhydride by the Diels-Alder or other addition reaction. These resins are often referred to in the art merely as "maleic resins" or "hard alkyds."

From the standpoint of manufacture and use, all subclasses or types of phthalic alkyds may be considered as modifications of glycerol phthalate. Although appreciable amounts of ethylene, diethylene, and triethylene glycols, as well as sorbitol mannitol, and the pentaerythritols are used as modifying agents, by far more glycerol is used as the polyhydric alcohol in making phthalic alkyds than all the other polyhydric alcohols combined. The types of phthalic alkyds found to be particularly useful in the present invention include (a) drying oil-modified type, (b) natural resin-modified type, (c) maleic anhydride-modified type, (d) phenolic-modified type, and (e) amine resin-modified type.

Likewise, there are several subclasses or types of maleic alkyds. These include (a) saturated polyhydric alcohol ester resins, (b) oil-modified straight maleic resins, (c) addition products with oil and glycerol or other polyhydric alcohol, (d) polyhydric alcohol esters of rosin and those of abietic acid, (e) polyhydric alcohol esters of terpene adducts, and (f) polyhydric alcohol esters of adducts of conjugated diolefins (ester resins).

Maleic anhydride-polyhydric alcohol resins modified with vinyl compounds are also applicable to the present invention. These vinyl compounds include, e.g., styrene, vinyl chloride, acrylates, etc.

Also applicable in my invention are alkyds based on polybasic acids or anhydrides besides maleic and phthalic. These include, e.g., polyesters of natural resins (e.g., copals), polyesters of such dibasic acids, e.g., as the dimer of abietic acid.

The polyhydric alcohol esters of a rosin acid material (e.g., wood rosin), the polyhydric alcohol esters of a rosin acid material and an alpha-, beta-ethylenically unsaturated dibasic aliphatic acid or anhydride (e.g., maleic, fumaric, itaconic, citraconic, etc.), and the polyhydric alcohol esters of a rosin acid material and phthalic acid or anhydride applicable in my invention are widely used in industry today. Glycerol and the pentaerythritols are the most frequently used polyhydric alcohols.

While I have obtained excellent results using as little as 3.75% hydrophobic film former by weight of the material being insolubilized, substantially lower amounts are applicable in accordance with my invention. The minimum amount of hydrophobic film former which can be used is that amount which gives a substantially continuous coating, and normally this will be a coating which is at least one molecule thick. It should be pointed out, however, that this minimum amount will vary depending on a number of things, e.g., the molecular weight and other properties of the particular hydrophobic film former used. There is no limit on the upper amount of film former which may be used except from a practical standpoint.

As to insolubilizing agent the present invention is applicable broadly to any material which substantially reduces the water solubility of the water-soluble materials to be insolubilized. For example, I have obtained good results with unsaturated monobasic aliphatic acids, unsaturated dibasic aliphatic acids, the anhydrides of said acids, the water-soluble derivatives of said acids and anhydrides, polyamide-epichlorohydrin resins, aldehydes, and the water-soluble salts of polyvalent metals which complex with cellulose. These include, e.g., acrylic acid, methacrylic acid, crotonic acid, maleic acid, maleic anhydride, citraconic acid, citraconic anhydride, itaconic acid, glutaconic acid, dihydromuconic acid, formaldehyde, glyoxal, and water-soluble salts of such polyvalent metals as, e.g., copper, chromium, vanadium, nickel, cobalt and aluminum.

Although my invention is applicable irrespective of the amount of insolubilizing agent used, when using unsaturated dibasic aliphatic acids and anhydrides, I prefer to use about 2%–8% by weight thereof of the material being insolubilized. The reason for this is that the extent of insolubilization increases to a peak with very small amounts of such insolubilizing agents and then becomes more soluble again with greater amounts of said insolubilizing agents. This peak was found to be 2% with maleic anhydride and hydroxyethyl cellulose. From 2% to 8% the percent insolubilization practically leveled off and then sharply decreased so that the insolubilization at 12% was substantially the same as at 1%. This is clearly shown in Table 2 hereinafter. In the experiments in Table 2 percent is by weight. The procedure used for carrying out these experiments was as follows.

A 5% aqueous solution of material to be insolubilized was prepared and the insolubilizing agent was added to this solution while stirring. Films were cast on glass plates from the resulting mixture. The films were then dried under the conditions stated. These films measured approximately 75 mils thick when wet and 2 mils thick when dry. The dried films were stripped from the glass plates and their water properties were determined as follows. *Determination of percent insoluble:* a one centimeter square portion of dried film was weighed immediately after drying and promptly soaked by immersing in 500 ml. of distilled water at room temperature (approximately 25° C.) for one hour and then dried to constant weight and finally weighed. The percent insoluble values were calculated by the formula: weight of dry film after soaking divided by weight of dry film before soaking. *Determination of percent swell:* a one centimeter square portion of dried film was weighed immediately after drying and then promptly soaked by immersing in 500 ml. of distilled water at room temperature for one hour and then blotted off with an ink blotter and finally weighed. The percent swell values were calculated by the formula: weight of blotted film minus weight of dried film divided by weight of dried film. The films were dried at 100° C. Further details are given in Table 2 below:

TABLE 2

| Experiment | Material Insolubilized | Insolubilizing Agent | | Temp., °C. | Water Properties of Film, Percent Insoluble |
|---|---|---|---|---|---|
| | | Type | Amount [1] | | |
| 1 | HEC | Maleic anhydride. | 1 | 100 | 81.35 |
| 2 | HEC | do | 2 | 100 | 90.66 |
| 3 | HEC | do | 4 | 100 | 92.39 |
| 4 | HEC | do | 6 | 100 | 93.02 |
| 5 | HEC | do | 8 | 100 | 94.73 |
| 6 | HEC | do | 12 | 100 | 82.11 |

[1] Percent by weight of the hydroxyethyl cellulose (HEC) used.

I have found that this difference in percent insolubilization when using as insolubilizing agent unsaturated dibasic aliphatic acids and anhydrides can be explained with reference to the mechanism of the insolubilization reaction. Up to about 8% insolubilizing agent, all of the insolubilization reaction occurs by cross-linking through *both* of the carboxyl groups of the insolubilizing agent. Above about 8% insolubilizing agent gives even somewhat more cross-linking through both carboxyls than is obtained with about 8% and below, and therefore one might expect a greater degree of insolubilization; however, the percent insolubilization actually decreases because most of the excess above 8% of the insolubilizing agent is consumed through reaction of only *one* of the carboxyl groups of the insolubilizing agent, thereby introducing free carboxyl groups which are hydrophilic and therefore decrease the percent insolubilization which has been obtained with up to about 8% insolubilizing agent. With amounts of insolubilizing agent up to about 2% the percent insolubilization is not as high as desired because this is not enough insolubilizing agent to cross-link with a sufficient percentage of the repeating units in the molecule of the material to be insolubilized.

The above-mentioned insolubilization mechanism was determined by measuring the acid numbers on films cross-linked with different amounts of insolubilizing agent ranging from 1%–16%. Thus the following experiments were carried out.

First, in order to remove any unreacted insolubilizing agent the films were soaked in a solvent for the insolubilizing agent. For instance, each film (2″ x 4″ x 2 mils thick) was immersed in 40 ml. of anhydrous isopropyl alcohol in a flask for 16 hours. The isopropyl alcohol was decanted and the films were rinsed with fresh isopropyl alcohol. In order to determine the amount, if any, of unreacted insolubilizing agent all the decanted isopropyl alcohol and the rinsed isopropyl alcohol were combined and titrated to phenolphthalein endpoint after adding 50 ml. of water and heating almost to boiling to hydrolyze any insolubilizing agent.

The residual carboxyl groups on the film were determined by immersing each film in 40 ml. of 75% ethyl alcohol (ASTM–D–871–56 Procedure), heating at 60° C. for 30 minutes, cooling and titrating the resulting aqueous alcohol in the presence of the film with a .5 N aqueous sodium hydroxide solution to phenolphthalein endpoint.

In order to determine the number of ester linkages (both mono- and di-) in the film, additional .5 N aqueous sodium hydroxide solution was added to this titrated aqueous alcohol solution containing the film until the total volume reached 80 ml. The flask was heated for 15 minutes at 60° C. and allowed to stand for about 36 hours. Then the solution was titrated in the presence of the film with .5 N hydrochloric acid to slight excess acidity and back-titrated again with .5 N aqueous sodium hydroxide solution to phenolphthalein endpoint.

The analytical results of these experiments are shown in Table 3 which follows. All films were HEC films insolubilized with maleic anhydride.

TABLE 3

| Maleic Anhydride Percent by Wt. of HEC | Acid Number | | |
|---|---|---|---|
| | Extract from Film [1] | Extracted Film [2] | Extracted Film After Saponification [3] |
| None | 4.7 | 15.1 | 53.3 |
| 1 | 1.4 | 4.5 | 27.3 |
| 2 | 1.5 | 8.5 | 32.1 |
| 4 | 4.6 | 17.2 | 47.6 |
| 8 | 8.2 | 22.0 | 72.0 |
| 12 | 19.1 | 29.4 | 98.8 |
| 16 | 46.1 | 28.6 | 103.0 |

[1] See the paragraph beginning at line 64 in column 7.
[2] See column 8 lines 1–7.
[3] See column 8 lines 8–17.

It is quite apparent from Table 3 above that with the films made using about 2%–8% insolubilizing agent substantially no unreacted insolubilizing agent was found whereas with the films made using amounts outside this range and particularly above about 8% insolubilizing agent a substantial amount of unreacted insolubilizing agent was found. Also, in contrast with the other experiments substantial amounts of insolubilizing agent were consumed through reaction with only one of the carboxyl groups of the insolubilizing agent when using amounts of insolubilizing agent above about 8%.

In general, the time of the insolubilizing reaction to obtain maximum degree of insolubilization and reduction in percent swell is the time required to substantially dry a mixture of the ether, insolubilizing agent and hydrophobic film former. This, in turn, will depend on the temperature used; the higher the temperature, the shorter the time and conversely. I have obtained good results at room temperature, 100° C. and 130° C. Of course, the maximum temperature should be below that which would decompose or otherwise seriously damage the mixture or product being made therefrom. The above apply to all materials hereof insolubilized.

This invention is applicable irrespective of the degree of substitution or viscosity of the materials to be insolubilized. Thus I have obtained satisfactory results in accordance with this invention employing said materials to be insolubilized having a wide range of degree of substitution and viscosity. For instance, I have used said materials having low, medium and high viscosities and having both lower and higher degrees of substitution than those shown in the above examples.

The products of this invention are useful in the preparation of films and permanent fabric sizes having a high degree of water resistance. In addition, applicant has found that these products are applicable in protective coatings. In all of these and similar applications where it is desirable that the final product have such properties, it is highly desirable that the product can be applied from high solids content aqueous solutions thereof and then insolubilized after application. This makes the product very practical and economical to use.

As many apparent and widely different embodiments of this invention may be made without departing from the spirit and scope thereof, it is to be understood that the invention is not limited to the specific embodiments thereof except as defined in the appended claims.

What I claim and desire to protect by Letters Patent is:

1. Process of reducing the water solubility and water sensitivity of water-soluble materials which comprises preparing an aqueous mixture of said water-soluble material and an insolubilizing agent therefor, uniformly and stably distributing a hydrophobic film former throughout said mixture, substantially drying the resulting mixture at a temperature from room temperature to a temperature sufficiently low that neither the constituents of the mixture nor the resulting product being prepared begin to decompose, whereby the hydrophobic film former migrates to the surface of the resulting mixture, the insolubilizing agent substantially insolubilizes the water-soluble material, and the hydrophobic film former forms a substantially continuous water-insoluble water-impervious and water-insensitive film on the surface of said insolubilized water-soluble material, the amount of the insolubilizing agent and hydrophobic film former being about 1%–20% and 3%–25%, respectively, by weight of said water-soluble material being insolubilized, said insolubilizing agent being a material selected from the group consisting of unsaturated monobasic aliphatic acids, unsaturated dibasic aliphatic acids, the anhydrides of said acids, the water-soluble derivatives of said acids and anhydrides, polyamide-epichlorohydrin resins, aldehydes, and the water-soluble salts of polyvalent metals which complex with cellulose, said water-soluble materials being selected from the group consisting of water-soluble carboxyalkyl and hydroxyalkyl ethers and esters of cellulose and starch; starches; vegetable gums; casein, gelatin, animal glue and soy protein; polyvinyl alcohol, polyacrylic acid, substituted polyacrylic acid, copolymers derived from maleic anhydride; polyamides; and polymeric amines, said hydrophobic film former being selected from the group consisting of linseed oil, dehydrogenated castor oil, tung oil, soybean oil, poppyseed oil, hempseed oil, oiticica, fish oil, safflower oil, perilla, tall oil, sunflower oil, beeswax, hydrogenated spermaceti wax, Chinese wax, shellac wax, carnauba wax, ouricury wax, palm wax, candelilla wax, sugar cane wax, montan wax, ozocerite wax, paraffin wax, alkyd resins.

2. Process of claim 1 wherein said water-soluble material is starch.

3. Process of claim 1 wherein said water-soluble material is a vegetable gum.

4. Process of claim 1 wherein said water-soluble material is a protein.

5. Process of claim 1 wherein said water-soluble material is poly(vinyl alcohol).

6. Process of claim 1 wherein said water-soluble material is poly(acrylic acid).

7. Process of claim 1 wherein said water-soluble material is polyacrylamide.

8. Process of claim 1 wherein said water-soluble material is a hydroxyalkyl starch.

9. Process of claim 1 wherein said water-soluble material is a hydroxyalkyl cellulose.

10. Process of claim 1 wherein said water-soluble material is hydroxyethyl cellulose.

11. Process of claim 1 wherein said water-soluble material is hydroxyethyl starch.

12. Process of claim 1 wherein said water-soluble material is a dialkylaminoalkyl starch.

13. Process of claim 1 wherein said water-soluble material is a dialkylaminoalkyl hydroxyalkyl starch.

14. Process of claim 1 wherein said water-soluble material is diethylaminoethyl hydroxypropyl starch.

15. Process of claim 1 wherein said water-soluble material is a carboxyalkyl hydroxyalkyl cellulose.

16. Process of claim 1 wherein said water-soluble material is carboxymethyl hydroxyethyl cellulose.

17. Process of claim 1 wherein the insolubilizing agent is a polyamide-epichlorohydrin resin.

18. Process of claim 1 wherein said insolubilizing agent is an unsaturated aliphatic dibasic anhydride.

19. Process of claim 1 wherein said insolubilizing agent is an unsaturated aliphatic monobasic acid.

20. Process of claim 1 wherein said insolubilizing agent is maleic anhydride.

21. Process of claim 1 wherein said insolubilizing agent is methacrylic acid.

22. Process of claim 1 wherein said insolubilizing agent is an aldehyde.

23. Process of claim 1 wherein the hydrophobic film former is a drying oil.

24. Process of claim 1 wherein the hydrophobic film former is a wax.

25. Process of claim 1 wherein the hydrophobic film former is an alkyd resin.

26. Process of claim 1 wherein the hydrophobic film former is dehydrogenated castor oil.

27. Process of claim 1 wherein the hydrophobic film former is linseed oil.

28. Process of claim 1 wherein said water-soluble material is a carboxyalkyl cellulose.

29. Process of claim 1 wherein said water-soluble material is carboxymethylcellulose.

30. Process of claim 1 wherein said water-soluble material is an alkyl hydroxyalkyl cellulose.

References Cited by the Examiner

UNITED STATES PATENTS

| | | | |
|---|---|---|---|
| 149,440 | 3/1874 | Carpenter | 106—211 |
| 1,283,913 | 11/1918 | Rodenberger | 106—211 |
| 1,625,672 | 4/1927 | Moreton | 106—206 |
| 1,633,106 | 6/1927 | Kelly | 106—211 |
| 2,230,656 | 2/1941 | Scholler | 106—211 |
| 2,304,252 | 12/1942 | Hager et al. | 106—186 |
| 2,402,351 | 6/1946 | Smith et al. | 106—134 |
| 2,809,945 | 10/1957 | Wright et al. | 260—17 |
| 2,832,746 | 4/1958 | Jackson | 260—17 |
| 2,842,451 | 7/1958 | Grummitt et al. | |
| 2,988,455 | 6/1961 | Rosenberg et al. | 106—197 |
| 3,044,898 | 7/1962 | Habib. | |
| 3,077,468 | 2/1963 | Guerden | 260—232 |

MORRIS LIEBMAN, *Primary Examiner.*

JOHN H. MACK, ALEXANDER H. BRODMERKEL,
*Examiners.*

A. LIEBERMAN, *Assistant Examiner.*